Patented May 12, 1942

2,282,819

UNITED STATES PATENT OFFICE 2,282,819

TREATMENT OF HYDROGENATED OILS

Sidney Musher, New York, N. Y., assignor to Musher Foundation Incorporated, New York, N. Y., a corporation of New York No Drawing. Application May 13, 1940, Serial No. 334,899

6 Claims. (Cl. 99—123)

This invention relates to the treatment of hydrogenated oils in substantially solid, plastic, fatty and/or waxy form in order to enhance their frying odors and flavors.

In the case of the hydrogenated shortenings and those particularly made from cottonseed oil, by the time those oils have been put through the usual refining treatment including causticizing, bleaching, hydrogenating and deodorizing, such shortenings are comparatively odorless and flavorless and frequently take on objectionable hydrogenated odors when used in the home for deep fat frying, or in the manufacture of pie crust or for similar baking purposes. This objectionable odor developing from the hydrogenated shortenings is particularly to be observed with hydrogenated cottonseed oil shortening and develops when the oil is subjected to an elevated temperature during the frying operation, such as when the shortening reaches a temperature of between 275° F. and 350° F.

An object of this invention is to reduce the development of the characteristic hydrogenated odor and taste in the shortening as well as in the fried or baked product with which the shortening is used.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, it has been found possible to incorporate a small amount of specially treated peanuts, preferably unroasted, in the hydrogenated oil in substantially uniform dispersion to produce a new flavored oil having a distinctly different odor in frying, which peanuts will remain substantially in uniform dispersion even when the oil is molten or melted and will not cause objectionable discoloration.

The peanuts are first treated in order to remove the outer hull or shell. This is desirably done by subjecting the peanuts to a cracking process whereby the pod is cracked and then subjected to a current of air in order to blow away the hull.

The peanuts are then preferably treated with a saturated brine to remove the earthy taste which has been found most objectionable. For example, the peanuts may be immersed in a saturated salt solution for about 30 minutes to 5 hours, although shorter periods may be employed where the earthy taste is not so pronounced.

The peanuts may also be immersed in a less concentrated salt solution particularly where the curing is extended over a longer period.

After curing, the peanuts may, where desired, be lightly washed to remove the adhering excess salt and they may then be subjected to a drying operation which is conducted preferably at a low temperature in order to prevent any roasting from taking place. The temperature of the drying should desirably not exceed about 220° F. at atmospheric pressure and the moisture content of the cured peanuts should be reduced to less than 15% and desirably to less than 10%.

The peanuts that have been thus cured and dehydrated are then subjected to a fine rolling or milling operation. This is preferably accomplished by placing the peanuts between iron or stone rollers so that the individual cells of the peanuts are broken in two, releasing the oil contained therein and this rolling is continued until a fine paste is formed. Preferably, the upper roll operates at a different speed than the lower roll in order to cause a grinding and crushing operation and to more thoroughly macerate the peanuts and produce a break-down of the cell structure to enable the entire peanut to be ground to a finely macerated condition.

At this point the macerated peanuts may be put through a colloid mill in order more thoroughly to grind and subdivide the peanut solids.

The macerated peanuts thus obtained have a mild pleasing odor and a slightly bitter taste, but do not show any roast characteristics nor any dark color other than a light gray that is characteristic of this particular material.

In the preparation of the peanuts, care must be exercised that after the decorticating and during the drying, the temperature of the drying operation should be no higher than about 220° F. because otherwise a roasted odor and flavor will appear which is not desirable for use with hydrogenated oils.

In addition, following the drying operation, the peanuts must be macerated to a sufficiently fine form so that when rubbed between the fingers, no individual particles of the peanuts can be felt.

The cured, dehydrated, macerated peanuts are then added to the hydrogenated glyceride oil following the last stage in the processing of the oil and after deodorization, the addition being made in a very small amount, less than 5%, and desirably in an amount of about 1.5% or less.

The macerated peanuts are added to the hydrogenated cottonseed oil, for example, while the oil is in a molten condition.

Where, following the addition of the macerated peanuts thereto, the hydrogenated cottonseed oil is solid or plastic, it may be heated to a temperature of about 200° F. to 210° F. as this is the temperature that is desired in order to bring out the full characteristic aromatic flavoring property in the hydrogenated cottonseed oil without developing any burnt flavor, and in order to prevent the occurrence of the objectionable hydrogenated odor and flavor characteristics.

The macerated peanuts must be thoroughly admixed in the hydrogenated cottonseed oil. Preferably, following the addition of the peanuts to the shortening, the mixture is put through a colloid mill in order to spread more thoroughly the individual particles of the peanuts through the shortening and to obtain a more thorough admixture of the peanuts in the shortening, whereby there is imparted to the shortening the most desirable characteristics with the least quantity of the peanuts.

When the cured macerated peanuts are heated in the shortening to the temperature of 200° F. to 210° F. and held at that temperature for a short period, such as for about 5 minutes, the shortening containing the macerated peanuts may then be cooled down to a temperature just above its solidifying point and then applied to the chilled surface of a roll, removed from that roll and plasticized, churned or beaten up in order to incorporate therein a small amount of air ranging up to about 5% to 10% and then filled into the shortening containers.

The shortening containing the macerated peanuts prepared in this manner does not have a very noticeable or positive aroma or flavor when plasticized or when packed and there is but very little difference in appearance between hydrogenated cottonseed oil containing, for example, 1% of the macerated cured peanuts prepared in the aforesaid manner, and the hydrogenated shortening when prepared without the peanuts.

However, when that hydrogenated shortening containing the macerated cured peanuts is used for cooking, frying or baking purposes, there is imparted to the baked, cooked or fried products a highly desirable aroma and flavor.

When, for example, the treated hydrogenated shortening is used in the manufacture of a pound cake, the pound cake has in accentuated form the fine flavor of the various ingredients including the essential oil ingredients contained therein and has a much superior and more appetizing flavor and aroma than pound cake made with ordinary shortening without the macerated peanuts. In addition, when the treated shortening is used for deep fat frying purposes, even though that shortening contains a small amount of peanut solids as, for example, when using 1% of the macerated cured peanuts, the cottonseed shortening containing approximately 0.55% by weight of peanut solids, nevertheless because of the special preparation of the peanuts as aforementioned, there will not be developed any substantial burning or scorching of the peanut solids at the bottom of the frying pan. This is most unusual because it would normally be expected that any oil insoluble material present in the shortening would certainly produce burning, but with the amount that is utilized, such as about 1% to 2%, and with the peanuts prepared in the special manner indicated above, there will be substantially no residue at the bottom of the frying pan as the individual particles of the peanuts are apparently maintained in thorough suspension in the shortening without becoming deposited and without material charring on the frying pan.

In addition, whereas ordinary hydrogenated cottonseed and other shortenings have a most objectionable hydrogenated odor when used for the manufacture of pie crust, or when used for deep fat frying, such hydrogenated odor being characteristic of a "rubberiness" which is most objectionable, the use of the macerated peanuts in the hydrogenated cottonseed oil overcomes this "rubberiness" and objectionable hydrogenated odor.

Moreover, the shortening containing the macerated cured peanuts has a sweet aroma and flavor when used in the cooking and frying operation. It is not the characteristic odor and flavor of ordinary peanuts or of peanut oil, but seems to take on an entirely new and different and distinctive flavor and odor that has a certain sugar sweetness or candy-like aroma that is highly desirable and that is particularly desirable for use in cooking, baking and frying purposes.

From the standpoint of keeping quality, it has also been observed that the specially cured macerated peanuts in the hydrogenated shortening will very materially increase the resistance of the shortening to rancidity.

Although it is particularly desirable to use the macerated peanuts in connection with hydrogenated cottonseed oil shortening, the peanut may also be applied to other types of solid or plastic, waxy, fatty glyceride materials, and preferably those which have been in whole or in part hydrogenated, such as compound or hydrogenated shortenings produced from cottonseed, corn, peanut, sesame, sunflower seed, and soya bean.

The peanuts may also be cured to remove the earthy taste by treatment with a substantially saturated salt solution at temperatures up to boiling, followed by drying.

The peanuts may be cured either in their roasted or unroasted condition. Preferably, however, the peanuts are cured in their unroasted condition, followed, where desired, by roasting. Where the peanuts are to be roasted after immersion in the brine solution, the step of dehydration and roasting may be conducted simultaneously in the roasting chamber.

Together with or in lieu of the peanuts, soya beans may also be employed. The soya beans may be salt cured in a similar manner as the peanuts and the salt cured soya beans thereupon where desired may be dehydrated and utilized in accordance with the present invention.

The present invention is a continuation-in-part of copending application, Serial No. 282,081, filed June 30, 1939, now Patent 2,201,112, and through said application continues the subject matter of applications, Serial No. 294,633, filed September 13, 1939, now Patent 2,198,204 and Serial No. 301,759, filed October 28, 1939, now Patent 2,198,220.

Having described my invention, what I claim is:

1. A hydrogenated shortening composition, having a desirable flavor and odor and improved frying and baking characteristics, carrying thoroughly dispersed therethrough a small amount of a salt cured macerated legume selected from the group consisting of peanuts and soya beans.

2. A hydrogenated shortening composition, having a desirable flavor and odor and improved frying and baking characteristics, carrying thoroughly dispersed therethrough a small amount of dehulled, low moisture containing salt cured, unroasted, macerated peanuts.

3. A plastic, hydrogenated cottonseed oil shortening composition, having a desirable flavor and odor and improved frying and baking characteristics, carrying thoroughly dispersed therethrough a small amount of low moisture containing, salt cured, macerated soya beans.

4. A method of producing novel plastic hydrogenated shortening compositions having a desirable flavor and odor and improved frying and baking characteristics, which comprises adding thereto a small amount, less than 5%, of a salt cured macerated legume selected from the group consisting of peanuts and soya beans.

5. A method for producing novel plastic cottonseed oil shortening compositions having a desirable flavor and odor and improved frying and baking characteristics, which comprises adding thereto a small amount, less than 5%, of a salt cured macerated legume selected from the group consisting of peanuts and soya beans.

6. A method for producing novel plastic hydrogenated shortening compositions having a desirable flavor and odor and improved frying and baking characteristics, which comprises adding a small amount, less than 5%, of salt cured, macerated peanuts to the shortening after hydrogenation and deodorizing.

SIDNEY MUSHER.